United States Patent

[11] 3,581,870

[72] Inventor Howard S. Best
 Horseheads, N.Y.
[21] Appl No. 849,104
[22] Filed Aug. 11, 1969
[45] Patented June 1, 1971
[73] Assignee Corning Glass Works
 Corning, N.Y.

[54] ARTICLE HANDLING
 6 Claims, 9 Drawing Figs.

[52] U.S. Cl...................................... 198/33,
 198/40, 198/80, 198/135, 53/78
[51] Int. Cl........................................ B65g 47/24
[50] Field of Search............................ 198/33, 35,
 40, 45, 79, 80, 135; 53/59, 78

[56] References Cited
UNITED STATES PATENTS
3,250,372 5/1966 Wagner et al............. 198/33X
3,410,404 11/1968 Glasson.................... 198/35X Primary Examiner—Evon C. Blunk
Assistant Examiner—L. Shane
Attorneys—Clarence R. Patty, Jr. and Charles W. Gregg ABSTRACT: Apparatus for receiving a multitude of similar elongate articles, such as lengths of rod or tubing, from a plurality of conveyors which deliver such articles to an article delivery station, and for longitudinally orienting said articles with corresponding ends thereof in alignment with each other and delivering the articles in their oriented arrangement to a second station for operations to be performed thereon.

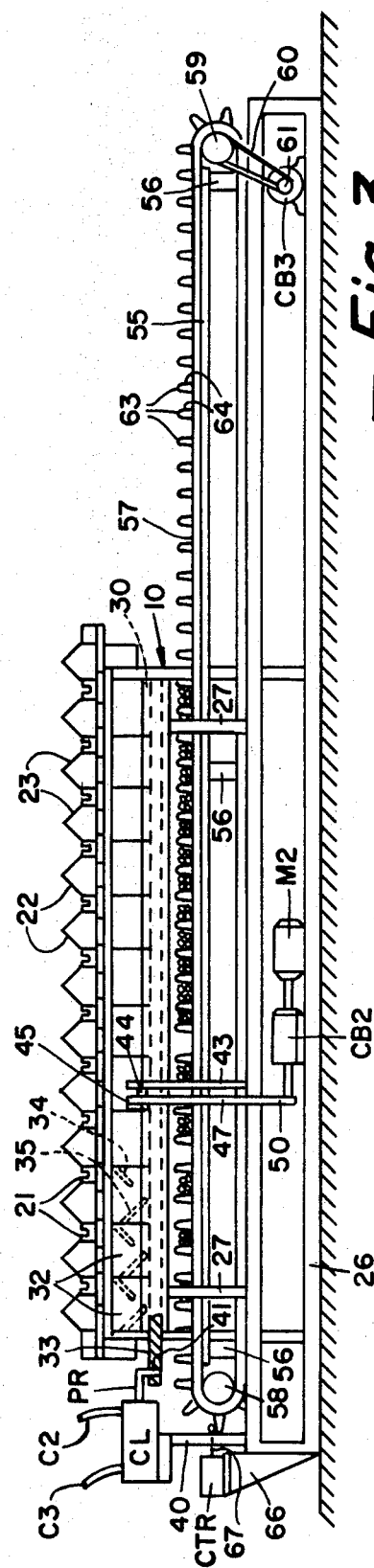
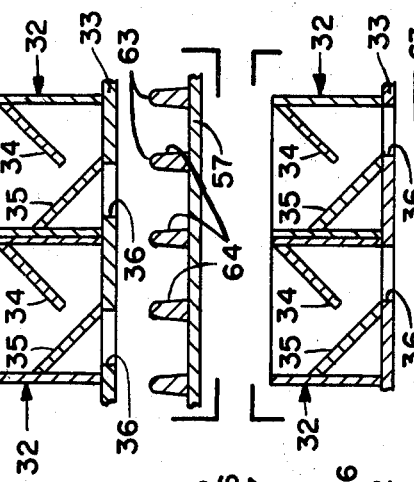
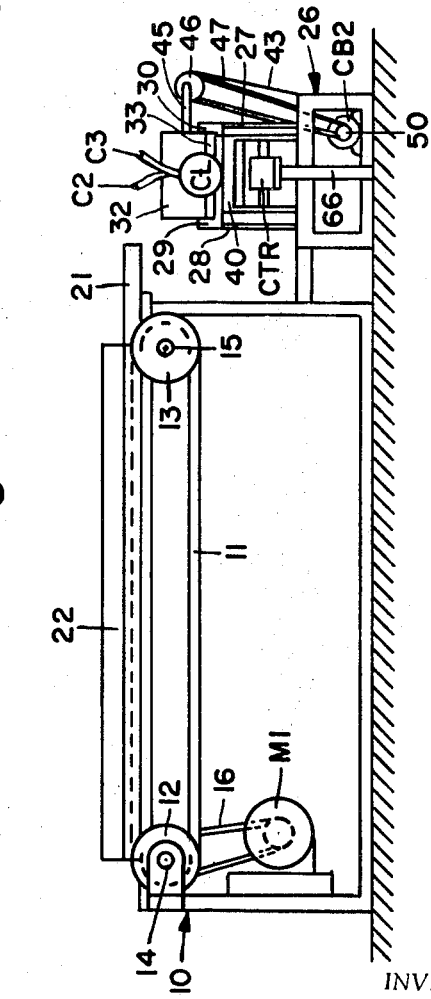
INVENTOR.
Howard S. Best
BY Charles W. Gregg
AGENT

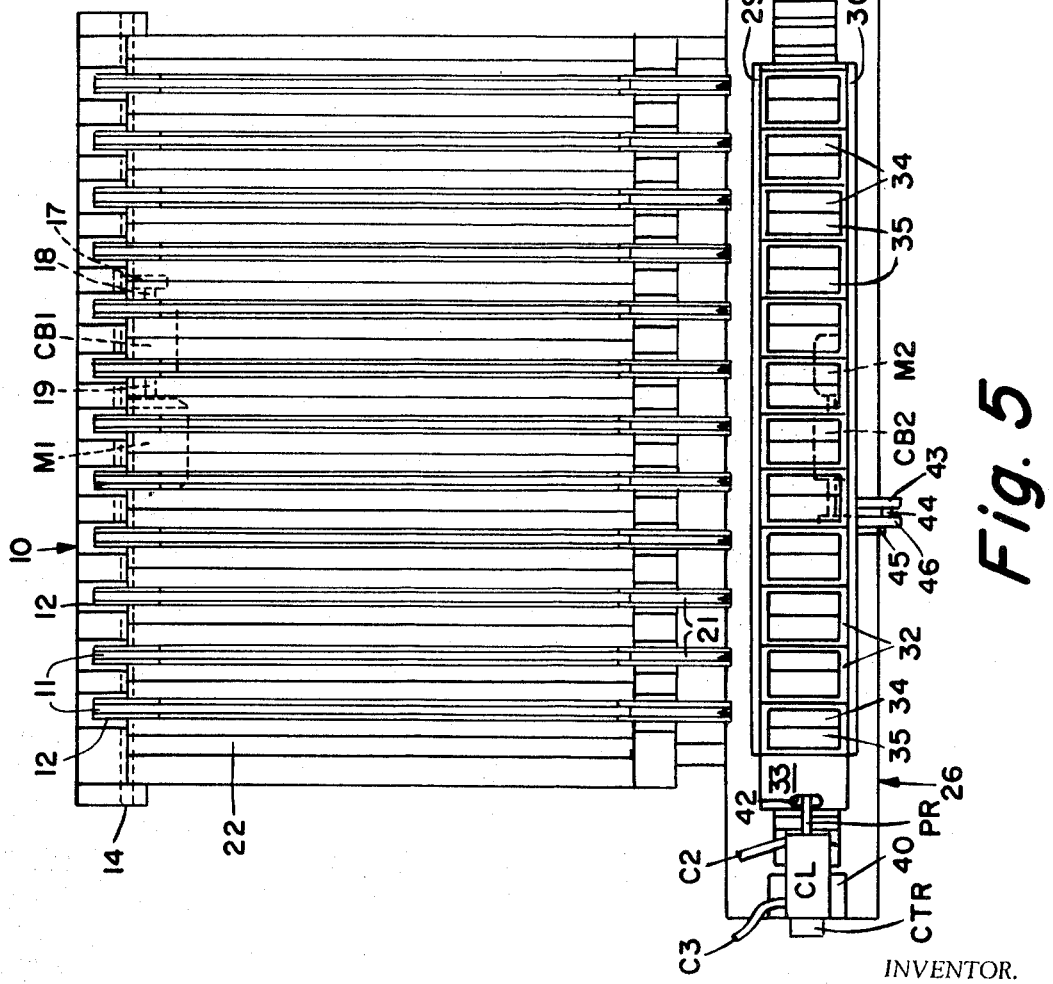

ARTICLE HANDLING

BACKGROUND OF THE INVENTION

There are numerous installations or operations where it is necessary, for obvious economic reasons, to handle and orient a multitude of articles such as lengths of rod or tubing at a high rate of speed. For example, in one known installation or operation each of a succession of relatively long lengths of rod or tubing is cut simultaneously at equidistant points along the length thereof to provide similar relatively short lengths of rod or tubing at speeds of from 1,000 to 4,000 per minute. It is obvious that in such an operation said short lengths of rod or tubing must be conveyed or transported away from the cutting location at a speed corresponding to the speed of the cutting operation in order to prevent a buildup of a multitude of the cut lengths of rod or tubing at said location. Said articles or cut lengths of rod or tubing are usually delivered to another location for additional operations, such as packaging or end finishing, to be performed thereon.

In said known installation said conveying of the articles or cut lengths of rod or tubing was heretofore accomplished by the use of a plurality of conveyors extending parallel with each other beneath the cutting apparatus and equal in number to the maximum number of cut lengths provided by each said cutting of the long lengths of rod or tubing. Such conveyors transferred said cut-lengths or articles directly to a single conveyor belt located below the article exit end of said conveyors and extending normal to the path of movement of the conveyors to said other location. By such arrangement the articles leaving the exit end of said conveyors fell onto the conveyor belt in a random manner resulting in a great amount of skew or longitudinal misalignment of the articles and a substantial amount of misalignment of the ends of the articles relative to each other. It was necessary, therefore, to have employees located along the conveyor belt to straighten and/or align the articles as much as possible before they reached said other or second location. In view of the above problems an apparatus was long sought which could operate to handle said articles or cut lengths of rod or tubing at a high rate of speed and deliver said articles to said other or second station without skew or misalignment etc. therebetween. The apparatus of the present invention was conceived and built to accomplish such objective.

SUMMARY OF THE INVENTION

In accomplishing the above described objects of the invention there is provided a plurality of bins, one associated with each said conveyor and each located at the exit end of the respectively associated conveyor for receipt of said articles or cut lengths of rod or tubing transported by the respective conveyor. An endless conveyor belt including a succession of pockets on the outer periphery thereof is located below said bins and extends normal to the path of movement of said conveyors to the previously mentioned second or other location. A gating means is located between said bins and said conveyor belt to at times empty the articles accumulated or collected in the bins into said pockets on said conveyor belt. Motor means, counting means and timing means are provided to repeatedly operate said conveyors and gating means in a predetermined sequence to be described. Means are also provided to, at times, impart shaking motion or movement to said bins if found desirable or necessary to do so to settle and align the articles deposited or accumulated in the bins.

BRIEF DESCRIPTION OF THE DRAWINGS

In the drawings:

FIG. 1 comprises a side elevational view of the apparatus embodying the invention;

FIG. 2 is an elevational view of the left-hand end, when viewing FIG. 1, of the apparatus of FIG. 1;

FIGS. 3 and 4 comprise enlarged cross-sectional views of parts of the apparatus of the invention;

FIG. 5 is a top plan view of the apparatus embodying the invention;

FIG. 6 is an enlarged view of a part of the apparatus of the invention;

FIGS. 7 and 8 are views taken generally on lines 7—7 and 8—8, respectively, of FIG. 6.

Figure 9:
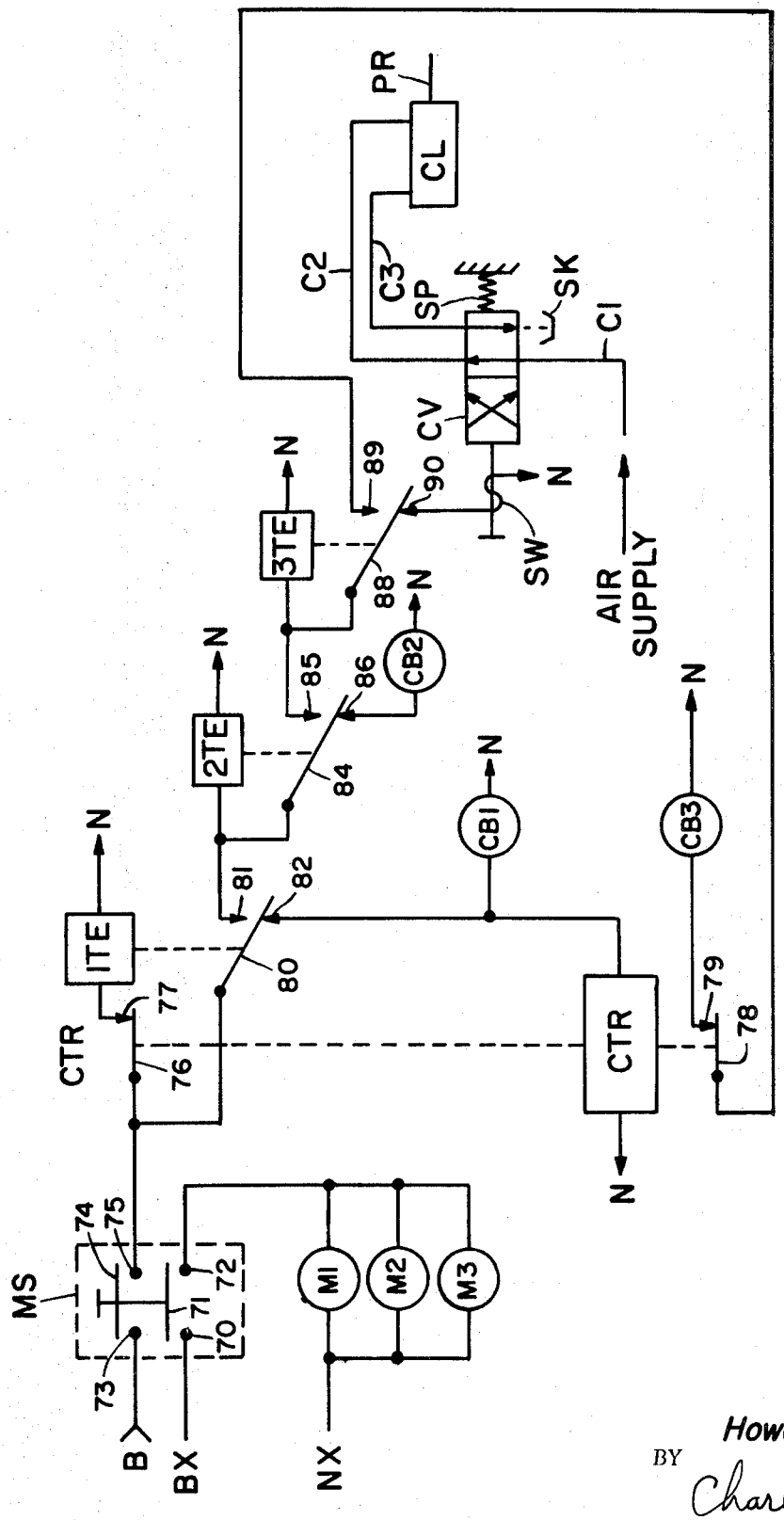
FIG. 9 is a diagrammatic illustration of a control system employed in conjunction with the other apparatus of the invention.

Although the apparatus is shown somewhat schematically in the drawings, the structure and operation thereof will be readily apparent from the following description taken in conjunction with the drawings.

Similar reference characters refer to similar parts in each of the figures of the drawings.

PREFERRED EMBODIMENT OF THE INVENTION

Referring to FIGS. 1, 2 and 5 there is shown a plurality of endless conveyors such as 11 which extend parallel with each other and are generally equally spaced apart. Such conveyors are each looped about a pair of pulleys such as 12 and 13 which are rotatably carried on shafts 14 and 15, respectively, which are supported on a suitable frame 10. The pulleys such as 12 are each affixed to shaft 14 for rotation therewith while the pulleys such as 13 may be freely rotatable on shaft 15. A suitable drive belt 16 loops about a pulley 17 provided on the output shaft 18 of an electrically actuated clutch-brake CB1 and about a pulley (not shown) affixed on shaft 14 for driven rotation thereof. The input shaft 19 of clutch-brake CB1 is connected to the output shaft of a motor M1 and, when motor M1 and clutch-brake CB1 are energized as hereinafter further discussed, the conveyors such as 11 are driven so as to convey articles supplied to such conveyors in a direction from left to right when viewing FIG. 2 of the drawings. Electrically actuated clutch-brakes such as CB1 are well-known components.

An article guide chute such as 21 is provided at the article exit end of each of the conveyors such as 11 and, as best illustrated in FIGS. 6, 7 and 8, each such chute is contoured to conveniently receive the articles supplied thereto from the respectively associated conveyor 11 and guide such articles to a respectively associated bin as hereinafter described. A pair of declined plates such as 22 and 23 are also associated with each conveyor such as 11 and extend parallel with the respectively associated conveyor for substantially the full length thereof. Such plates guide articles supplied to the article receiving ends of conveyors 11 onto such conveyors in a generally longitudinally aligned orientation therewith, as is believed apparent. As previously mentioned, the conveyors such as 11, the chutes such as 21, the declined plates such as 22 and 23, and the other apparatus associated with such components were known and used prior to the present invention.

A longitudinal support frame or table 26 which extends normal to the article exit ends of the conveyors, such as 11, and the chutes, such as 21, is located adjacent and below said exit ends of chutes 21 as best illustrated in FIGS. 2 and 5. First or lower ends of a plurality of upright leaf springs such as 27 and 28 (FIGS. 1 and 2) are secured in any convenient manner to the top surface of frame or table 26 and a pair of L-shaped slide rails 29 and 30 are affixed to the second or upper ends of the springs such as 27 and 28, respectively. A plurality of open-topped bins such as 32 are juxtaposed side by side, adjacent ones of such bins being attached to each other. Such bins are supported on rails 29 and 30 near the upper ends of the upright portions of such L-shaped rails thereby leaving a space in which a slide plate or article gating plate member or means 33 (FIG. 2) is disposed, as hereinafter further discussed, for sliding movement on rails 29 and 30 adjacent to and beneath the bottoms of bins 32. There is one bin such as 32 associated with each of the conveyors such as 11 and the respectively associated chute such as 21. The top of each bin 32 is located below and near the article exit end of its respectively associated chute so as to receive the articles delivered from such exit end as hereinafter further described.

The bins such as 32 have an inside length slightly longer than the length of the longitudinal or elongate articles to be delivered to the bins and the interior of each bin is provided with a plurality of declined plates such as 34 and 35 (FIGS. 1, 3 and 4) which are located progressively lower and alternate from one side to the other in the respective bin. Such plates check the fall of and guide the articles delivered to each respective bin, as is believed readily apparent. The lower edge of the lower plate such as 35 in each respective bin generally coincides with the centerline of such bin to thereby close off approximately one-half of the otherwise open bottom of the respective bin.

Previously mentioned slide plate or article gating plate member or means 33 embodies a plurality of fenestrations such as 36 (FIGS. 3 and 4) which have dimensions generally corresponding to or slightly larger than the open portions of the bottoms of the bins such as 32. Such fenestrations are also separated from each other a selected distance such that longitudinal sliding movement of the plate or plate member 33 beneath the bottoms of the bins such as 32 substantially opens and closes the otherwise open parts of the bottoms of such bins. A motor means comprising a pressurized fluid-operated cylinder CL is secured to the top surface of a suitable support member 40 whose bottom end is affixed to the top of frame 26 adjacent the left-hand end thereof when viewing FIGS. 1 and 5. The otherwise free end of piston rod PR of cylinder CL has a downwardly projecting extension 41 (FIG. 1) which extends into a slot 42 (FIG. 5) provided in article gating plate member 33 near the left-hand end thereof when viewing FIGS. 1 and 5. The purpose of such arrangement will be discussed hereinafter in an operational example of the invention.

The lower end of a generally upward extending support 43 is secured to the top of frame 26 and the upper end of such support carries on a short axle 44 a pulley 46 which is freely rotatable on such axle. One end of a actuating arm 45 is pivotally secured in any convenient manner to pulley 46 slightly off the center of such pulley as illustrated in FIG. 2. The second end of arm 45 is secured to one of the bins such as 32 and, by such arrangement, rotation of pulley 46 will impart a sidewise shaking or vibratory motion to the plurality of bins which, as previously mentioned, are attached to each other. The leaf springs such as 27 and 28 which support rails 29 and 30 permit said shaking or vibratory motion. A second motor MC and associated electrically actuated clutch-brake CB2 are mounted on frame 26, as best illustrated in FIG. 1, and a drive belt 47 is looped about a suitable pulley 50 (FIG. 2) on the output shaft of clutch-brake CB2 and about the previously mentioned pulley 46 to impart the previously mentioned rotation thereto and, thereby, the previously mentioned shaking motion to the bins. The output shaft of motor M2 is connected to the input shaft of clutch-brake CB2 as illustrated in FIG. 1. Clutch-brake CB2 may, for example, be similar to clutch-brake CB1 previously discussed. The purpose and operation of the shaker arrangement will also be further discussed hereinafter in an operational example of the invention.

A conveyor belt longitudinal support plate 55 (FIG. 1) is supported above the upper part of frame 26 by a plurality of uprights such as 56 and the inner surface of an endless conveyor belt 57 rests on the top surface of plate 55 as illustrated in FIG. 1. Conveyor belt 57 extends about the outer periphery of a freely rotatable idler wheel 58 suitably rotatably supported on frame 26 near the left-hand end thereof when viewing FIG. 1 and about the outer periphery of a drive wheel 59 which has a suitable pulley fastened thereto for receipt of a drive belt 60 which also loops about the outer periphery of a pulley 61 mounted on the output shaft of an electrically actuated clutch-brake CB3. The input shaft of clutch-brake CB3 is fastened to the output shaft of a third motor M3 (FIG. 5). By such arrangement conveyor belt 57 may be driven so that the upper part thereof moves in a direction from left to right when viewing FIG. 1. This will also be further discussed hereinafter in an operational example of the invention. There is secured to the outer surface of conveyor belt 57 a succession of evenly spaced-apart members or cleats such as 63 which provide on the outer periphery of belt 57 a series of contiguous article conveying pockets such as 64 each having a width generally corresponding to the width of the previously mentioned fenestrations such as 36 in plate member 33 (FIGS. 3 and 4). The purpose of the pockets such as 64 will become more apparent hereinafter.

There is attached to the left-hand end of frame 26 a support member 66 upon whose top surface is mounted a mechanically actuated counting device or counter CTR which has an actuating arm 67 (FIG. 1) which is positioned to be actuated by the passage of each cleat or member such as 63 on conveyor belt 57. Counter CTR thus counts the passage of each said cleat and such counter can count up to a number at least equal to the number of the conveyors such as 11 or the bins such as 32. In the specific embodiment of the invention as illustrated in the drawings, counter CTR counts the passage of twelve cleats at which point the counter actuates normally closed electrical circuit controlling contacts to opened conditions as hereinafter further described. Counter CTR also includes an electrically actuated reset means or winding upon energization of which said electrical circuit controlling contacts are reactuated to their normally closed conditions as also hereinafter further discussed. Counters such as CTR are well known.

Referring now to FIG. 9 of the drawings the control system for the apparatus of the invention will be described. It is pointed out that some of the components represented in FIG. 9 are shown in other Figures of the drawings and, in such instances, such components are designated by corresponding reference characters.

A manually operated master switch MS controls the energization of the control system as well as the energization of motors M1, M2, M3 illustrated in FIG. 9 by the corresponding encircled reference characters and, when such switch is actuated by manual depression thereof, alternating current from a suitable source is supplied to said motors for energization thereof as diagrammatically illustrated in FIG. 9. The opposite terminals of the source of alternating current are designated by reference characters BX and NX, while the positive and negative terminals of a suitable source of direct current are designated by reference characters B and N, respectively. When master switch MS is actuated to energize said motors and the components energized by said source of direct current, such switch remains in the actuated position until it is manually reactuated to interrupt the supplies of electrical energy to the motors and other components shown. The sources of alternating and direct currents are not shown in the drawings for purpose of simplification thereof.

Referring further to FIG. 9, there is shown a series of relays designated 1TE, 2TE and 3TE which are time element relays that actuate movable members of their electric circuit controlling contacts from first positions to second positions only upon the expiration of a predetermined time delay following the energization of the control winding of the respective relay. Such control windings are represented in FIG. 9 by a box or block in a conventional manner and each respective block contains the reference character such as 1TE, 2TE, and 3TE designating the respective relay. Upon deenergization of the control winding of each said relay said movable members of said contacts of the respective relays return immediately to their said first positions shown in FIG. 9, that is, return to such positions without any time delay. Such time element relays are also well known.

There is also shown in FIG. 9 a solenoid-actuated fluid flow control valve CV which controls the supply or pressurized fluid, such as compressed air for example, to previously mentioned motor means or pressurized fluid-actuated cylinder CL. Valve CV includes a solenoid winding SW and a compressible coil spring SP. Such valve is connected over a first conduit or pipe C1 to a suitable source of compressed air designated "air supply" and such pressurized fluid normally flows through the valve and through a suitable conduit or pipe C2 to one end of motor means or cylinder CL to maintain piston rod PR normally retracted within the cylinder. At such time, the other end of cylinder CL is connected through a suitable fluid conduit or pipe C3 and valve CV to atmosphere or to a suitable fluid sink SK. When the solenoid winding SW of valve CV is energized, as hereinafter discussed, valve CV is actuated to reverse the connections from the valve to conduits C2 and C3. At such time, said other end of cylinder CL is connected to the pressurized fluid or compressed air supply while the end of such cylinder, previously connected to said supply, is connected through valve CV to fluid sink SK or to atmosphere. Piston rod PR is, thereby, actuated to its extended condition at such time. Upon subsequent deenergization of solenoid winding SW, coil spring SP of valve CV reactuates such valve to its normal position shown in FIG. 9 and rod PR is, thereby, returned to its retracted position within cylinder CL. This will be discussed further hereinafter in an operational example of the invention.

It is pointed out that pipes or conduits C2 and C3 shown in FIG. 9 correspond respectively to conduits C2 and C3 shown in FIGS. 1, 2 and 5 of the drawings. Also the encircled reference characters CB1, CB2 and CB3 shown in FIG. 9 represent the control windings of the clutch-brakes designated by corresponding reference characters in FIGS. 1, 2 and 5 of the drawings. When such windings are energized in the manner hereinafter described, the apparatus previously discussed as being driven by motors M1, M2, and M3 is connected, through the respectively associated clutch-brake, for driven movement thereby by said motors. Upon deenergization of the control winding of each respective clutch-brake such component acts as a brake to bring the respectively associated apparatus driven through the respective clutch-brake to a substantially immediate stop.

For the purposes of an operational example of the invention it will be assumed that the supplying of a multitude of longitudinal articles such as rods or tubings to the entrance end of the conveyors such as 11 (left hand end when viewing FIG. 2) is initiated. Such supply may be from any source such as, as previously mentioned, from an automatic cutting machine which very rapidly severs long lengths of rods or tubings into shorter lengths which are to be similarly oriented and conveyed to a station for operations to be performed thereon. Immediately prior to or simultaneously with said initiation of the supplying of said articles to conveyors 11, master switch MS in FIG. 9 is depressed and alternating current is thereby supplied over contact members 70—71—72 of switch MS to motors M1, M2 and M3, while direct current is supplied over contact members 73—74—75 of switch MS and contact members 76—77 of counter CTR to the control winding of relay 1TE. At such time, direct current is also supplied over contact members 73—74—75 of switch MS and contact members 80—82 of relay 1TE to the reset winding of counter CTR and to the control winding of clutch-brake CB1. The current thus supplied to clutch-brake CB1 actuates such component to cause the conveyors such as 11 (FIG. 2) to be connected to be driven by motor M1 and thereby convey the articles being supplied to the entrance end of the conveyors towards the exit end thereof. At the exit end of conveyors the articles being conveyed are supplied to the entrance end of the chutes such as 21 with sufficient velocity that the articles issue from the exit end of the chutes and drop into the bins such as 32 disposed near to and below said exit end of the chutes such as 21.

Time delay 1TE is adjusted so that its contact members 80—82 open and contact members 80—81 close upon the expiration a time delay period following the previously described energization of the control winding of the relay, such time delay period being selected so that the conveyors such as 11 are stopped when the bins such as 32 are filled to a point desired or considered expedient. Following the expiration of said time delay period, therefore, contact members 80—82 of relay 1TE open to interrupt the energization of the control winding of clutch-brake CB1, and contact members 80—81 close to energize the control windings of relay 2TE and of clutch-brake CB2. The deenergization of the control winding of clutch-brake CB1 by contact members 80—82 causes actuation of clutch-brake CB1 to interrupt the driven relationship between the conveyors such as 11 and motor M1 and to stop the movement of the conveyors immediately as possible. The energization of the control winding of clutch-brake CB2 causes the previously discussed bin shaker or vibrator arrangement, including drive belt 47, pulley 46 and actuating arm 45 (FIG. 2) to be actuated by motor M2 and the bins such as 32 are thereby shaken or vibrated to cause the articles previously supplied thereto to be settled and longitudinally oriented or aligned with each other in the respective bins.

Upon the expiration of the time delay period of relay 2TE, which may be relatively short, contact members 84—86 and 84—85 of such relay are opened and closed, respectively. Such actuation of said contact members interrupts the energization of the control winding of clutch-brake CB2, and causes energization of the control winding of time delay relay 3TE and of solenoid winding of control valve CV. The deenergization of the control winding of clutch-brake CB2 interrupts the shaking or vibration of the bins such as 32. The energization of solenoid winding SW of valve CV actuates such valve, as previously discussed, to interrupt the supply of pressurized fluid to conduit C2 and to supply such fluid to conduit C3 and thence to the right-hand end (viewing FIGS. 1 and 9) of motor means or cylinder CL. The piston rod PR of cylinder CL is, thereby, actuated to its extended position to actuate gating member or plate 33 in a corresponding direction to move the fenestrations such as 36 in such plate to positions below the openings in the bottom of the bins such as 32, that is, to move plate 33 from its position illustrated in FIG. 3 to its position illustrated in FIG. 4. This permits the articles in the bins such as 32 to fall into the pockets such as 64 which are defined by the cleats such as 63 on conveyor belt 57.

Following the expiration of the time delay period of relay 3TE contact members 88—90 and 88—89 of such relay are actuated to open and closed conditions, respectively. Such actuation deenergizes the solenoid winding SW of valve CV and spring SP of such valve returns the valve to its normal condition thereby again reversing the connections to conduits C2 and C3 and causing piston rod PR of cylinder CL to return to its normally retracted position within such cylinder. The retraction of piston rod PR returns plate 33 to its normal position below the bins such as 32 as illustrated in FIG. 3, that is, with the fenestrations such as 36 in plate 33 below the parts of the bottoms of the bins which are closed off by the declined plates such as 35 provided in the bins.

The aforementioned closure of contact members 88—89 of relay 3TE closes an energizing circuit, including contact members 78—79 of counter CTR, to the control winding of clutch-brake CB3. Such energization of the control winding of clutch-brake CB3 connects conveyor belt 57 to be driven by motor M3 until the passage of twelve successive cleats on such belt are counted by counter CTR, thereby actuating contact members 78—79 and 76—77 of the counter to their open conditions. The opening of contact members 78—79 of counter CTR interrupts the energization of the control winding of clutch-brake CB3 and further movement of conveyor belt 57 is terminated. The opening of contact members 76—77 of counter CTR deenergizes the control winding of relay 1TE and such relay actuates its contact members 80—81 and 80—82 to open and closed conditions, respectively. The closing of contact members 80—82 of relay 1TE energizes the control winding of clutch-brake CB1 and resets counter CTR, and a second cycle of operation of the apparatus is, thereby, preliminarily initiated. The reset of counter CTR reactuates contact members 76—77 and 78—79 to their closed conditions and the initiation of said second operational cycle of the apparatus is completed. It will be noted that, when contact members 80—81 of relay 1TE were actuated to their open condition as mentioned above, the control windings of relays 2TE and 3TE were deenergized, the control winding of the latter relay also being deenergized by the opening of contact members 84—85 of relay 2TE.

Referring further to FIG. 1, it will be further noted that a succession of twelve pockets such as 64 on conveyor belt 57 are shown located below the first six adjoining bins 32 (when viewing FIG. 1 and counting from the left-hand end towards the right-hand end of the succession of bins shown in said drawing FIG.) It will also be noted that only alternate ones of succession of twelve pockets are illustrated as containing articles such as handled by the apparatus of the invention. In other words adjacent pockets on conveyor belt 57 are spaced apart on such belt a distance generally equal to half the width of one of the bins such as 32, that is to say, the width of each pocket of the series of pockets such as 64 on conveyor belt 57 generally corresponds to the width of each of the fenestrations such as 36 embodied in plate 33. By such arrangement, alternate ones of the pockets such as 64 are loaded from the first six bins of the succession of twelve bins as mentioned above as being illustrated in FIG. 1, while the pockets between such alternate pockets are loaded from the last six bins of the succession of twelve bins. It is for this reason that counter CTR counts, as discussed in the operational example previously set forth, the passage of only twelve bins during each cycle of operation of the apparatus of the invention.

I claim:

1. In combination with a plurality of conveyors aligned parallel with each other for conveying a multitude of elongate articles such as similar lengths of rod or tubing in a direction towards an article delivery station located at the article exit end of said conveyors and first motor means for driving said conveyors in such direction; an apparatus for receiving, handling and longitudinally orienting said articles with corresponding ends thereof substantially in alignment with each other and for delivering said articles in their oriented condition to a second station for operations to be performed thereon, such apparatus comprising;
   A. an open-topped article-receiving bin associated with each said conveyor, each such bin located at said article delivery station with the top thereof below the level of said article exit end of the respectively associated conveyor and each such bin having a length slightly longer than said articles;
   B. A plurality of declined plates located progressively lower and alternating from one side to the other in each said bin for checking the fall of and guiding the articles delivered thereto by the respectively associated conveyor, the lower edge of the lowermost plate in each respective bin generally coinciding with a line projected between selected similar points on the bottom edges of the ends of such bin to thereby close off a selected part of the width of the otherwise open bottom of the bin;
   C. A fenestrate longitudinal article-gating plate member disposed adjacent the bottoms of said bins for reciprocative longitudinal movement thereunder, the fenestrations in such plate member separated from each other a selected distance and having selected dimensions such that said longitudinal movement of the fenestrate plate member substantially closes and opens the remaining open parts of the widths of the bottoms of all of said bins simultaneously;
   D. second motor means connected to said gating member for imparting said reciprocative longitudinal movement to such member at selected times to open and close said remaining open parts of the widths of the bottoms of said bins:
   E. an endless conveyor belt supported for movement through a vertically looped path of travel, a first part of such path of travel extending beneath said gating member in general alignment with the path of said longitudinal movement of such member and a second part of such path of travel extending generally from the end of said first part of the path to said second station, such conveyor belt including on the outer periphery thereof a series of contiguous article-conveying pockets each having a width generally corresponding to the width of said fenestrations in said gating member;
   F. third motor means for driving said conveyor belt through its said path of travel at selected times; and
   G. a control system for controlling the energization of said motor means, such system including a counting means for counting the passage of said pockets past a selected point in the path of travel of said conveyor belt and timing means, and such system operating to sequentially,
      a. energize said first motor means until the expiration of a selected period of time for which said timing means is set and then deenergizing such motor means,
      b. energize said second motor means to impart said reciprocative longitudinal movement to said gating plate member and then deenergizing such motor means,
      c. energize said third motor means until said counting means counts the passage of a number of said pockets corresponding to the number of said bins and then deenergizing such motor means, and
      d. recurrently repeating said energization and deenergization cycles in said sequence.

2. Apparatus in accordance with claim 1 and further including resilient means supporting said bins, a fourth motor means connected to said bins for imparting shaking motion thereto, and circuit means, controlled by said timing means, for energizing said fourth motor means for a selected period of time, such time period interposed between said energization and deenergization cycles of said first and said second motor means.

3. In combination with a plurality of conveyors aligned parallel with each other for conveying a multitude of elongate articles such as similar lengths of rod or tubing in a direction towards an article delivery station located at the article exit end of said conveyors and first motor means for driving said conveyors in such direction; apparatus for receiving, handling and longitudinally orienting said articles with corresponding ends thereof substantially in alignment with each other and for delivering said articles in their oriented arrangement to a second station for operations to be performed thereon, such apparatus comprising;
   A. an open-topped article-receiving bin associated with each said conveyor, each such bin located at said article delivery station with the top thereof below the level of said article exit end of the respectively associated conveyor and each such bin having a length slightly longer than said articles;
   B. a plurality of declined plates located progressively lower and alternating from one side to the other in each said bin for checking the fall of and guiding the articles delivered thereto by the respectively associated conveyor, the lower edge of the lowermost plate in each respective bin generally coinciding with a line projected between selected similar points on the bottom edges of the ends of such bin to thereby close off a selected part of the width of the otherwise open bottom of the bin;
   C. a fenestrate longitudinal article-gating plate member disposed adjacent the bottoms of said bins for reciprocative longitudinal movement thereunder, the fenestrations in such plate member separated from each other a selected distance and having selected dimensions such that said longitudinal movement of the fenestrate plate member substantially opens and closes the remaining open parts of the widths of the bottoms of all of said bins simultaneously;
   D. second motor means connected to said gating member for imparting said reciprocative longitudinal movement to such member at selected times to open and close said remaining open parts of the widths of the bottoms of said bins;
   E. an endless conveyor belt supported for movement through a vertically looped path of travel, a first part of such path of travel extending beneath said gating member in general alignment with the path of said longitudinal movement of such member and a second part of such path of travel extending generally from the end of said first part of the path to said second station, such conveyor belt including on the outer periphery thereof a series of contiguous article-conveying pockets each having a width generally corresponding to the width of said fenestrations in said gating plate member;

F. third motor means for driving said conveyor belt through its said path of travel at selected times;

G. means for counting the passage of said pockets past a selected point in said path of travel of said conveyor belt; and H. timing means for energizing said first motor means to drive said conveyors for a selected period of time and, subsequent to such period, energizing said second motor means to impart a cycle of said reciprocative movement to said gating member and, subsequent to such cycle of movement, energizing said third motor means to drive said conveyor belt through its said path of travel until said counting means counts the passage of a number of said pockets corresponding to the number of said bins, and recurrently repeating said cycles of energization of said motors in the sequence set forth.

4. Apparatus in accordance with claim 3 and further including, resilient means supporting said bins, a fourth motor means connected to said bins for imparting shaking motion thereto, and means controlled by said timing means for energizing said fourth motor means for a selected period of time, such time period interposed between the deenergization of said first motor means and the energization of said second motor means.

5. In combination with a plurality of conveyors aligned parallel with each other for conveying a multitude of elongate articles such as similar lengths of rod or tubing in a direction towards an article delivery station located at the article exit end of said conveyors and first motor means for driving said conveyors in such direction; apparatus for receiving, handling and longitudinally orienting said articles with corresponding ends thereof substantially in alignment with each other and for delivering said oriented articles in their oriented condition to a second station for operations to be performed thereon, such apparatus comprising;

A. an open-topped article-receiving bin associated with each said conveyor, each such bin located at said article delivery station with the top thereof below the level of said article exit end of the respectively associated conveyor and each such bin having a length slightly longer than said articles;

B. a plurality of declined plates located progressively lower and alternating from one side to the other in each said bin for checking the fall of and guiding the articles delivered thereto by the respectively associated conveyor, the lower edge of the lowermost plate in each respective bin generally coinciding with a line projected between selected similar points on the bottom edges of the ends of such bin to thereby close off a selected part of the width of the otherwise open bottom of the bin;

C. a longitudinal article-gating and fenestrate plate member disposed adjacent the bottoms of said bins for reciprocative longitudinal movement thereunder, the fenestrations in such plate member separated from each other a selected distance and having selected dimensions such that said longitudinal movement of the fenestrate plate member substantially opens and closes the remaining open parts of the widths of the bottoms of all of said bins simultaneously;

D. second motor means connected to said gating member for imparting said reciprocative longitudinal movement to such member at selected times to open and close said remaining open parts of the widths of the bottoms of said bins;

E. an endless conveyor belt supported for movement through a vertically looped path of travel, a first part of such path of travel extending beneath said gating member in general alignment with the path of said longitudinal movement of such member and a second part of such path of travel extending generally from the end of said first part of the path to said second station, such conveyor belt including on the outer periphery thereof a series of contiguous article-conveying pockets each having a width generally corresponding to the width of said fenestrations in said gating member;

F. third motor means for at times driving said conveyor belt through its said path of travel;

G. timing means;

H. means for counting the passage of said pockets on said conveyor belt past a selected point in said path of travel of such belt;

I. circuit means controlled by said timing means for energizing said first motor means for a selected period of time;

J. circuit means controlled by said timing means for energizing said second motor means to impart a cycle of said reciprocative longitudinal movement to said gating means;

K. circuit means controlled by said timing and said counting means for energizing said third motor means until the counting means counts the passage of a number of said pockets equal to the number of said bins; and L. circuit means controlled by said timing and said counting means for repeating the described sequence of energization of said motor means following each preceding sequence of such energization.

6. Apparatus in accordance with claim 5 and further including resilient means supporting said bins, a fourth motor means connected to said bins for imparting shaking motion thereto, and circuit means, controlled by said timing means, for energizing said fourth motor means for a selected period of time interposed between the periods of energization of said first and said second motor means.